(12) United States Patent
van Cruyningen

(10) Patent No.: US 10,359,786 B2
(45) Date of Patent: Jul. 23, 2019

(54) UAV SHUTDOWN CONSTRAINT NEAR OVERHEAD LINES

(71) Applicant: Izak Jan van Cruyningen, Saratoga, CA (US)

(72) Inventor: Izak Jan van Cruyningen, Saratoga, CA (US)

(*) Notice: Subject to any disclaimer, the term of this patent is extended or adjusted under 35 U.S.C. 154(b) by 0 days.

(21) Appl. No.: 15/757,575

(22) PCT Filed: Sep. 4, 2016

(86) PCT No.: PCT/US2016/050315
§ 371 (c)(1),
(2) Date: Mar. 5, 2018

(87) PCT Pub. No.: WO2017/041070
PCT Pub. Date: Mar. 9, 2017

(65) Prior Publication Data
US 2018/0246528 A1    Aug. 30, 2018

Related U.S. Application Data

(60) Provisional application No. 62/214,955, filed on Sep. 5, 2015.

(51) Int. Cl.
*G05D 1/10* (2006.01)
*B64C 39/02* (2006.01)
*B64D 45/00* (2006.01)

(52) U.S. Cl.
CPC ........... *G05D 1/101* (2013.01); *B64C 39/024* (2013.01); *B64D 45/00* (2013.01);
(Continued)

(58) Field of Classification Search
CPC .................. G05D 1/101; B64C 39/024; B64C 2201/021; B64C 2201/108;
(Continued)

(56) References Cited

U.S. PATENT DOCUMENTS 6,868,314 B1 * 3/2005 Frink ........................ B64C 1/00
701/3
7,543,780 B1 * 6/2009 Marshall ............... B64C 39/024
244/194

(Continued)

OTHER PUBLICATIONS

Yang et al., CN 103135550, Jun. 5, 2013 (machine translation).*

*Primary Examiner* — Courtney D Heinle

(57) ABSTRACT

FIG. 1 shows airframe (10) with powertrain (11) supporting electromagnetic field strength sensor (12), reference electromagnetic field strength (14), comparator (16), and shutdown (18) flying along a transmission line with towers (40, 42, and 44), phase conductors (46, 48), and 50, and shield wires (52 and 54). Reference electromagnetic field strength (14) is adjusted before the flight to set the minimum electromagnetic field strength before shutdown (18) reduces the power to powertrain (11). The reference electromagnetic field strength (14) corresponding to a characteristic radial dimension (58), and thus virtual tunnel (22), outside of which airframe (10) cannot fly without automatic shutdown (18), regardless of the state of the autopilot, GPS signal, or radio link.

12 Claims, 4 Drawing Sheets

Figure 1:
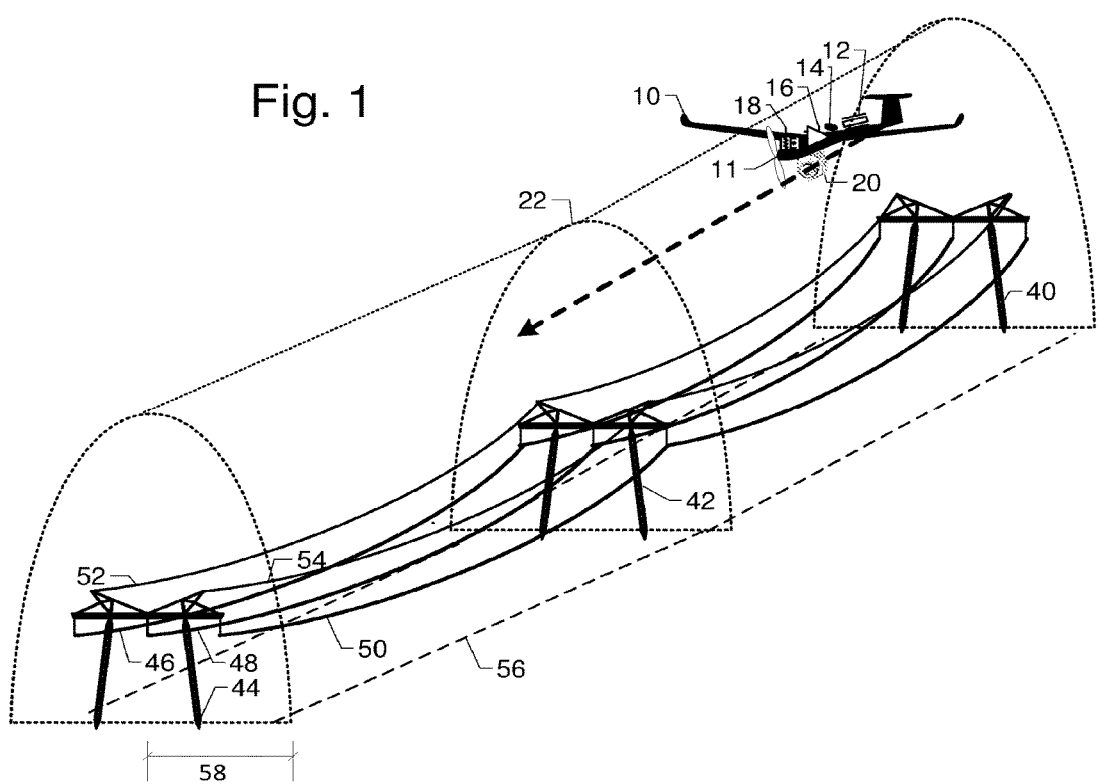

(52) U.S. Cl.
CPC .. *B64C 2201/021* (2013.01); *B64C 2201/042* (2013.01); *B64C 2201/104* (2013.01); *B64C 2201/108* (2013.01); *B64C 2201/14* (2013.01); *B64C 2201/141* (2013.01)

(58) Field of Classification Search
CPC .......... B64C 2201/14; B64C 2201/141; B64C 2201/042; B64C 2201/104; B64D 45/00
See application file for complete search history.

(56) References Cited

U.S. PATENT DOCUMENTS

| | | | |
|---|---|---|---|
| 2012/0016538 A1* | 1/2012 | Waite | G01C 21/20 701/3 |
| 2013/0233964 A1* | 9/2013 | Woodworth | B64C 37/02 244/2 |
| 2014/0191079 A1* | 7/2014 | Ehinger | B64C 27/12 244/17.13 |
| 2016/0216304 A1* | 7/2016 | Sekelsky | B64C 39/024 |
| 2016/0356863 A1* | 12/2016 | Boesch | G01R 33/032 |
| 2017/0110015 A1* | 4/2017 | Sekelsky | B64C 39/024 |

* cited by examiner

UAV SHUTDOWN CONSTRAINT NEAR OVERHEAD LINES

CROSS-REFERENCE TO RELATED APPLICATIONS

This application claims the benefit of provisional patent application Ser. No. 62/214,955 filed 2015 Sep. 5 by the present inventor.

BACKGROUND—PRIOR ART

This invention relates to flying an unmanned aerial vehicle (UAV) near overhead lines. To fly a UAV safely the US Federal Aviation Administration asks that you address three issues:

sense and avoid other air traffic,
maintain control even with a lost radio link, and
prevent spoofing or jamming of the control signals This invention addresses the latter two issues for flights near energized overhead lines by including an electromagnetic field sensor on the UAV that automatically shuts down the powertrain when the field strength drops below a preset value. The addition of the sensor and the shutdown mechanism ensure the UAV stays within a certain radial distance of the overhead line, thereby defining a virtual 'tunnel' around the overhead lines. Neither a lost radio link, nor malicious spoofing of the communication, nor jamming of the GPS signal, nor autopilot failure, nor incorrect waypoints allow the UAV out of the tunnel.

This application simplifies the system described in U.S. application Ser. No. 14/733,962 and PCT application US2015/034765, by eliminating the parachute. The parachute disclosed in those applications ensured a soft landing for the UAV, providing safety for any persons on the ground, protection for property on the ground, and preservation of the UAV.

A UAV with less than 2 kg all up weight is subject to fewer government regulations, because it is so much safer than heavier UAVs. The kinetic energy in a collision is low enough to reduce serious injury to persons and objects. To meet the 2 kg weight restriction while including a parachute sized large enough to ensure a soft landing is challenging. While developing and testing a power line inspection UAV we found we were almost always alone in the right of way near the transmission line. People are never allowed to live under transmission lines and while they occasionally pass under them to farm, park, or hike; the majority of lines are located away from urban areas. Similarly, very few structures are built under transmission lines. The right of way is a corridor free of obstructions to flight above the towers and lines and with few people, vehicles, or structures below the lines.

The likelihood of a flyaway is low and the likelihood of a person not involved with the flight being present in the right of way is low, so the likelihood of both events occurring at the same time and place is very, very low. While it may seem counterintuitive when considering only the flyaway scenario, it may be safer considering all UAV scenarios to have a lighter UAV with a simple shutdown in case of flyaway. Looking at only the flyaway problem, a parachute definitely adds safety for persons on the ground, protection for property on the ground, and cushioning for the UAV itself. However the parachute adds dead weight, so requires larger motors, propellers, and other powertrain components. Adding all the larger components and parachute increases the airframe weight, thus kinetic energy during flight, and thus risk during any type of collision. Many other things may go wrong even with flights entirely within the right of way. Thus if one multiplies the probability of occurrence times the severity of the result and adds them up for all the possible failures, it may be safer overall to have a lighter airframe without a parachute, as disclosed here. Typically the fewer components overall, the more reliable a system is.

SUMMARY

FIG. 1 shows airframe 10 with powertrain 11 supporting electromagnetic field strength sensor 12, reference electromagnetic field strength 14, comparator 16, and shutdown 18 flying along a transmission line with towers 40, 42, and 44, phase conductors 46, 48, and 50, and shield wires 52 and 54. Reference electromagnetic field strength 14 is adjusted before the flight to set the minimum electromagnetic field strength before shutdown 18 reduces the power to powertrain 11. The reference electromagnetic field strength 14 corresponding to a characteristic radial dimension 58, and thus virtual tunnel 22, outside of which airframe 10 cannot fly without automatic shutdown 18, regardless of the state of the autopilot, GPS signal, or radio link.

Advantages

Although electromagnetic field sensors, automatic shutdowns, and UAV flights near overhead lines are all well known in the prior art, the novel combination of these elements produces a method of constraining the UAV within a virtual tunnel to enhance safe operation. Various aspects of the embodiments of our UAV constraint system are superior because:

The UAV powertrain 11 will not operate outside virtual tunnel 22, no matter if the autopilot fails, the GPS fails, the operator makes a mistake in manual control or setting waypoints, a terrorist takes over radio control or jams the GPS signal, or the wind is too strong.

The constraint system is armed before takeoff and disarmed after landing, eliminating the risk of trying to remotely arm and disarm the system while in flight.

The constraint system may use its own sensor, power source, comparator, and shutdown, making it completely independent of the primary navigation and control systems.

The constraint system provides important additional safety for beyond line of sight flights.

Other advantages of one or more aspects will be apparent from a consideration of the drawings and ensuing description.

FIGURES

1. Perspective view of overhead line inspection flight path.
2. Preflight arming flowchart.
3. Schematic for analog UAV constraint circuit
4. Schematic for digital UAV constraint circuit
5. Schematic for analog UAV constraint limiting motor power
6. Section view of equipotential electric field around tower and lines (prior art)

DETAILED DESCRIPTION

This section describes several embodiments of the UAV constraint system with reference to FIGS. 1-6.

FIG. 1 is a perspective view of a flight near overhead lines. Airframe 10 with powertrain 11 supports electromagnetic field strength sensor 12, reference electromagnetic field strength 14, comparator 16, shutdown 18, and inspection camera 20. Not enumerated for clarity are standard, well-known components of an unmanned aerial vehicle used for normal navigation and flight including the control surfaces, radio control, autopilot, and GPS sensor. Powertrain 11 shown has a motor and a propeller. Other examples of powertrains are engines with impellers, ducted fans, jet engines, turbines, or other propulsion systems used in airframes. Towers 40, 42, and 44 support phase conductors 46, 48, and 50, as well as shield wires 52 and 54 within the right of way with boundary 56. Reference electromagnetic field strength 14 corresponds to a line of equal electromagnetic field strength that defines the edge of virtual tunnel 22 with a characteristic radial dimension 58, within which the UAV powertrain 11 is operational.

The example shown in FIG. 1 is a power transmission line but the same approach also applies to distribution, telephone, cable TV, and electric railway lines. Even overhead lines that are not normally energized, such as suspension bridge cables or guy wires for towers, can be energized for the duration of the flight to use this constraint system. If electromagnetic field strength sensor 12 is sensitive to magnetic fields, this approach can also be used for buried power lines.

Electromagnetic field strength sensor 12 can be purchased from AlphaLab, Combinova, or other vendors; or the principles and components they use can be incorporated in a custom design. Measuring the electromagnetic field strength can be done with electric field sensors, magnetic field sensors, or a combination. A small rectangle of conductive material such as aluminum foil will measure electric field strength in one dimension. Three rectangles on the orthogonal sides of a block can measure electric field strength in any direction. For an electric field strength sensor, virtual tunnel 22 is defined by equipotential lines at a characteristic radial dimension 58. A magnetic field can be measured by Hall Effect sensors, gauss meters, induction coils, fluxgate magnetometers, and other technologies.

Reference electromagnetic field strength 14 is the minimum electromagnetic field strength allowed before shutdown 18 turns down powertrain 11. The value may be measured and set for each particular line configuration, as described with reference to FIG. 2 below. It may also be set to a fixed small value for all lines; a fixed value for lines of a particular voltage and geometry; or it may be derived from a model or simulation of the power line configuration as discussed for FIG. 6 below.

A very simple approach is to set reference electromagnetic field strength 14 to a multiple of the expected ambient value for all lines. This may be more convenient, but it does not give as tight a constraint characteristic radial dimension 58 for virtual tunnel 22 for higher voltage lines. The 50 or 60 Hz electric field (E-field) strength depends on the line voltage and is strongly influenced by people, trees, or any conductors. The field strength drops off very quickly away from the line, from tens of thousands of volts per meter near the line down to ~100 V/m at 50-100 m away. Setting the reference electromagnetic field strength 14 to 100V/m for an E-Field sensor at 50 or 60 Hz would cover the majority of power lines. The magnetic (B-Field) strength also varies strongly with distance from the line with tens of microTesla near the line to less than one microTesla at 25-50 m away (1 microTesla=10 milliGauss). Setting the reference electromagnetic field strength 14 to a few microTesla for a B-Field sensor at 50 or 60 Hz would cover the majority of power lines.

The electromagnetic fields fall off very rapidly away from the phase conductors 46, 48, and 50. Close-in the field strength varies significantly with the geometry of the lines, but from about half a phase conductor separation away from the outer line the drop off in field strength is monotonic. Reference electromagnetic field strength 14 corresponds to a characteristic radial dimension 58 of a virtual tunnel 22 that constrains the UAV flight. If electromagnetic field strength sensor 12 measures electric field strength, then virtual tunnel 22 corresponds to an equipotential surface. The surface is symmetric along the lines, but varies radially. The radial shape of the surface depends very much on the geometry of the phase conductors and the presence of shield wires. For a single circuit with three lines across like towers 40, 42, and 44 with shield wires, the cylinder may be wider than tall. For a double circuit with tall towers and no shield wires it may be taller than wide.

If electromagnetic field strength sensor 12 is responsive enough to detect the 50 or 60 Hz variation in electromagnetic fields, then the field strengths could be measured with bandpass filters around the primary frequency of the power lines, 50 or 60 Hz. The bandpass filters reduce the influence of the earth's static electric field (150-2000 V/m depending on weather) or the earth's static magnetic field (20-80 microTesla depending on geographic location). The bandpass filter would also eliminate noise due to potential defects in the lines and towers producing higher frequency fields. With a responsive sensor, the field may have to be averaged over a number of cycles to get a reasonably accurate root mean square field strength measurement.

The reference electromagnetic field strength 14 can be stored as a setting of a potentiometer in an analog implementation, as described below with reference to FIGS. 2 and 3. In the approach described there, reference electromagnetic field strength 14 is set during flight precheck by walking the UAV radially away from lines 46, 48, and 50 towards the edge of right of way 56 and adjusting a potentiometer to match the field strength measured at the largest radial distance from the lines for the planned flight. In a digital implementation the reference electromagnetic field strength 14 can be stored in a memory location to be used by a processing unit 66. The reference electromagnetic field strength 14 might also be a fixed value at some multiple of the background field, or a calibrated fixed value if the UAV is used to inspect lines of comparable voltage and geometry. Another analog implementation would be to make the electromagnetic field strength sensor 12 have variable sensitivity or gain, and measure the adjusted gain relative to a fixed value. An analog implementation uses fewer parts and has fewer points of failure, while a digital implementation allows more flexibility.

Comparator 16 can be a simple analog signal comparator with reference electromagnetic field strength 14 in an analog implementation. In a digital implementation it would be the comparison operator instruction on a microprocessor. It could also be implemented as an inverter with a cutoff, a 555 timer, a zener diode, or other methods that allow comparison of one signal with another.

When comparator 16 detects a field strength below reference electromagnetic field strength 14, it signals shutdown 18 to reduce the power produced by powertrain 11. If powertrain 11 is powered by electricity, then shutdown 18 may be a relay to open the electric circuit to the motors or a switch to shorten or stop the PWM control signals to the motors. If powertrain 11 is powered by a combustible fuel such as gas, diesel, jet fuel, propane, methane, etc. then shutdown 18 may be a valve to close the fuel supply or a valve to close the air supply. Alternatively on a gas engine, shutdown 18 may open the ignition circuit to stop the engine. Yet another embodiment would open a clutch or disengage a transmission. Shutdown 18 serves to reduce the power produced by powertrain 11.

Figure 6:
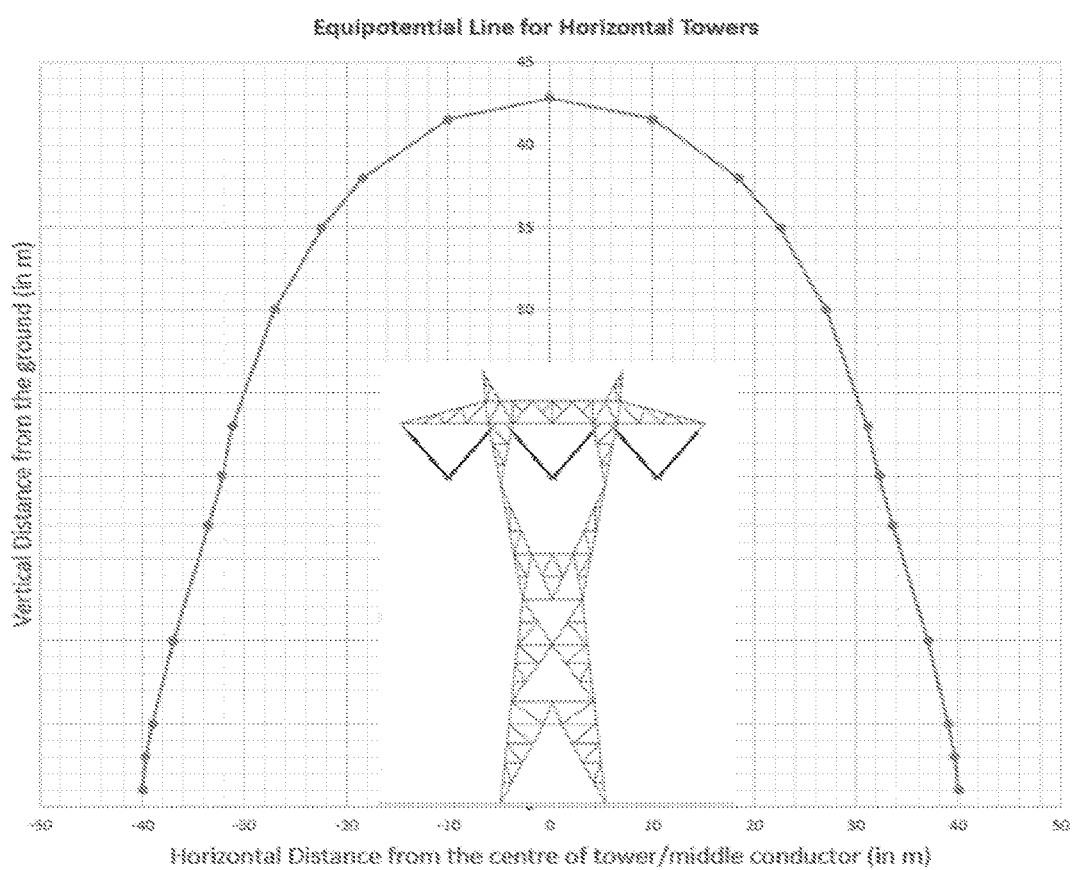

The electric and magnetic field strength around power lines has been extensively studied, both theoretically and experimentally. From the maximum allowable radial deviation in the desired inspection flight trajectory, the characteristic radial dimension 58 for virtual tunnel 22 can be estimated. Then if the power line voltage and geometry are known, the reference electromagnetic field strength 14 for that characteristic radial dimension 58 can be calculated from a model or simulation as shown in FIG. 6; or measured in-situ as described next.

Figure 2:
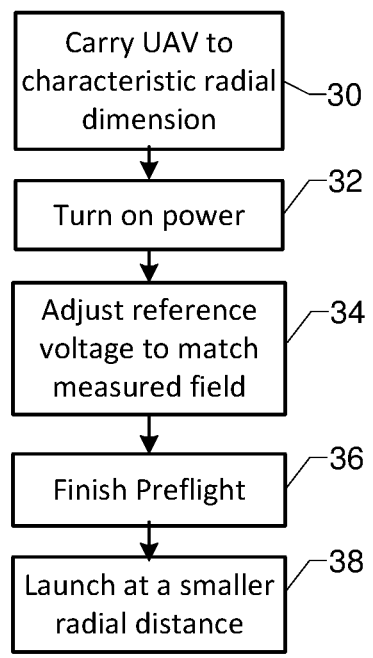

FIG. 2 is a flowchart illustrating one approach to adjusting the reference electromagnetic field strength 14 during preflight by measuring it in-situ. A right of way (ROW) encroachment inspection is typically flown at the edge of the ROW 56 at an altitude of about twice the tower height. With reference to FIG. 2, the operator carries the UAV to the characteristic radial dimension 30 from the overhead lines for the planned flight. For a ROW encroachment inspection this radial distance would be past the edge of ROW 56, as illustrated by characteristic radial dimension 58. A slightly larger radius than the planned flight allows for wind gusts and piloting overshoots. After turning on the power 32, the operator adjusts the reference electromagnetic field strength 14 to match the field strength measured at that location 34. This saves the reference electromagnetic field strength 14 for the duration of the flight. Then the operator finishes the rest of the preflight 36 and launches within the right of way 38. The UAV constraint system is armed and active from the time the system is turned on until it is turned off after landing at the end of the flight during post-flight.

Figure 3:
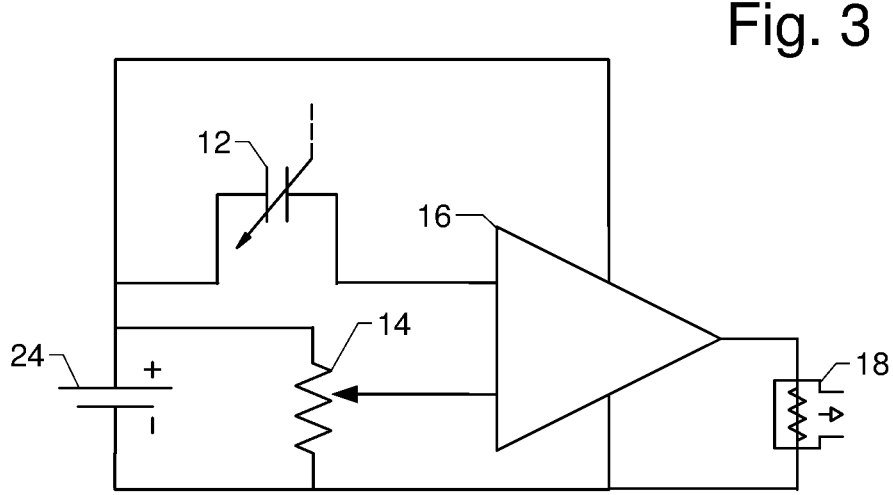

FIG. 3 shows a very simple analog implementation of the UAV constraint system. Power source 24 provides power to electromagnetic field strength sensor 12, reference electromagnetic field strength 14, and comparator 16. During preflight, the UAV is brought 30 to characteristic radial dimension 58 past the right of way boundary 56 and reference electromagnetic field strength 14 is adjusted to match the field strength measured at that location 34. Then the rest of the preflight is completed 36 and the UAV is launched at a smaller radial distance 38. If the UAV is carried or flown further away from the phase conductors 46, 48, and 50, then electromagnetic field strength sensor 12 will measure a field strength lower than the reference 14. Comparator 16 will cause shutdown 18 to slow down or stop powertrain 11. This stops the UAV from flying much beyond virtual tunnel 22.

If electromagnetic field strength sensor 12 is adjustable, then it is adjusted while reference field strength 14 is held fixed. If the UAV is specialized for specific line voltages and geometries, then reference field strength 14 may be a fixed value.

Figure 4:
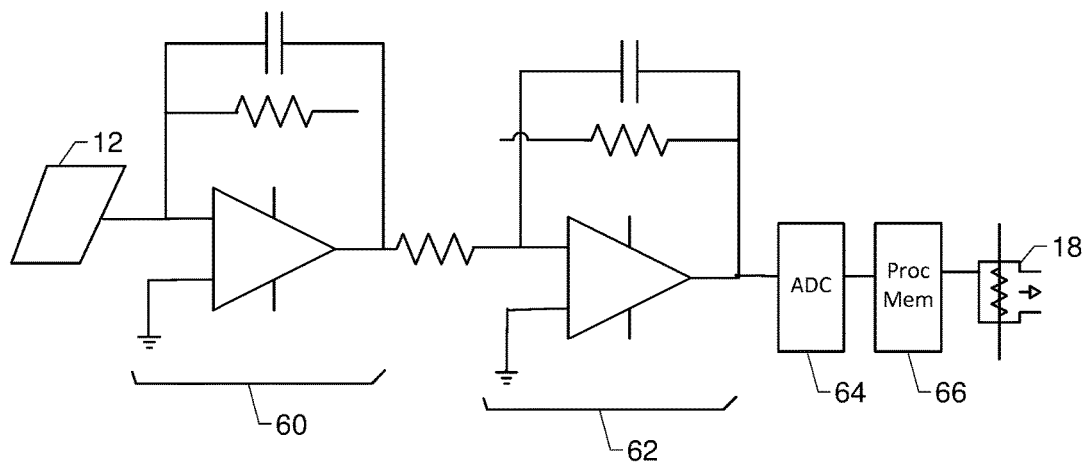

FIG. 4 shows a sample digital circuit implementation. Electromagnetic field strength sensor 12 provides an analog signal to a trans impedance amplifier 60; then a preamplifier with filter 62; and is then digitized by an analog to digital converter 64. The digital signal is filtered with a bandpass filter centered at 60 Hz (50 Hz outside North America) and averaged. The averaged value is compared by processor and memory 66 against the reference electromagnetic field strength 14 previously stored in processor and memory 66.

If the averaged signal is less than the reference electromagnetic field strength 14, then shutdown 18 slows down or stops powertrain 11.

Figure 5:
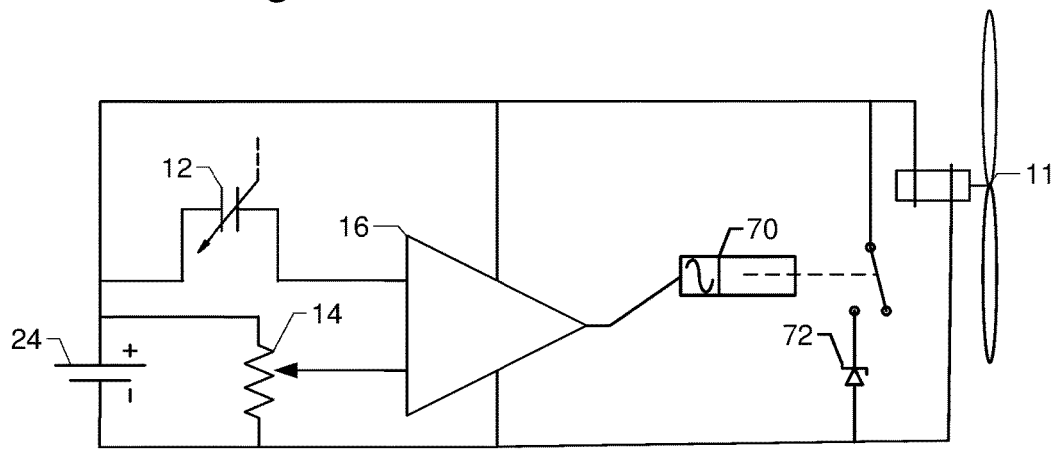

FIG. 5 shows a variation on shutdown 18 that allows for slowing down powertrain 11, rather than completely shutting it off. Battery 24 provides power to powertrain 11, electromagnetic field strength sensor 12, and reference electromagnetic field strength value 14. Comparator 16 is connected to an electronic switch 70 that shorts to voltage regulator 72 when comparator 16 detects electromagnetic field strength sensor 12 reads lower than reference electromagnetic field strength 14.

In normal operation powertrain 11 sees the full voltage of battery 24. If airframe 10 flies too far from power lines 46, 48, and 50 then electromagnetic field strength sensor 12 will measure a value less than reference electromagnetic field strength 14. Comparator 16 will activate electronic switch 70. Voltage regulator 72 will reduce the voltage across powertrain 11 to reduce its power.

Rotary wing aircraft are typically designed to hover at half their maximum power. The rotational speed of powertrain 11 depends directly on voltage through the KV value (rpm/V). If voltage regulator 72 is chosen to limit the rotational speed to a bit less than the hover speed, then airframe 10 will not descend as fast as simply cutting the power and falling out of the sky. The slower descent will reduce potential damage to people or objects on the ground, as well as to airframe 10.

Electronic switch 70 may be a relay, transistor, or one of many equivalent electronic components. Voltage regulator 72 is shown as a Zener diode, but could also be a TVS, SCR, diode, voltage divider, etc. An alternative approach is to regulate the current through powertrain 11 to keep the total power just below the hover requirement. The equivalent idea if powertrain 11 includes an internal combustion engine is to throttle the fuel or air, rather than completely cutting it off.

FIG. 6 (prior art) is the output of a simulation or model of a transmission line showing a line of constant electric field strength in a section view across the transmission lines. These models can be created by many different software packages as well as in spreadsheets.

This section illustrated details of specific embodiments, but persons skilled in the art can readily make modifications and changes that are still within the scope. The primary example described has been inspection of overhead lines, but delivery drones routing along overhead lines would also benefit greatly from this constraint.

I claim:

1. A method for constraining an unmanned aerial vehicle with a powertrain during flight near energized overhead lines comprising:
   storing a reference electromagnetic field strength prior to flight of said unmanned aerial vehicle, said stored reference electromagnetic field strength defining a virtual tunnel, said overhead lines located within the virtual tunnel,
   measuring electromagnetic field strength from said overhead lines at said unmanned aerial vehicle during flight,
   comparing said measured electromagnetic field strength against said stored reference electromagnetic field strength, and
   shutting down said powertrain when said comparison detects said measured electromagnetic field strength is less than said stored reference electromagnetic field strength,
   whereby said unmanned aerial vehicle is constrained to fly within the virtual tunnel around said overhead lines.

2. The method of claim 1 wherein said storing reference electromagnetic field strength comprises the steps of:
   bringing said unmanned aerial vehicle near to a largest radial distance of a planned flight path away from said overhead lines,
   measuring electromagnetic field strength from said overhead lines at said largest radial distance, and
   saving said measured electromagnetic field strength at said largest radial distance as reference electromagnetic field strength.

3. The method of claim 1 wherein said storing reference electromagnetic field strength comprises the steps of:
   calculating an expected electric field produced by said overhead lines, and
   saving the strength of said calculated field at a largest radial distance of a planned flight path from said overhead lines.

4. The method of claim 1 wherein
   said storing reference electromagnetic field strength stores an electric field strength, and
   said measuring electromagnetic field strength measures electric field strength for said overhead lines.

5. The method of claim 1 wherein
   said storing reference electromagnetic field strength stores a magnetic field strength, and
   said measuring electromagnetic field strength measures magnetic field strength for said overhead lines.

6. The method of claim 1 wherein said unmanned aerial vehicle is a rotary wing and said shutting down limits the power from said powertrain to less than the power required to maintain hover.

7. A constraint system for unmanned aerial vehicles flying near overhead lines comprising:
   a sensor to measure electromagnetic field strength from said overhead lines during flight of said unmanned aerial vehicle,
   a stored reference electromagnetic field strength,
   a powertrain mounted on said unmanned aerial vehicle,
   a shutdown mounted on said unmanned aerial vehicle to shut down said powertrain, and
   a comparator to activate said shutdown when electromagnetic field strength measured by said sensor is less than said stored reference electromagnetic field strength,
   whereby said unmanned aerial vehicle is constrained to fly within a virtual tunnel around said overhead lines; said stored reference electromagnetic field strength defines a boundary of said virtual tunnel; and said overhead lines are located within said virtual tunnel.

8. The constraint system of claim 7 wherein said sensor measures electric field strength.

9. The constraint system of claim 7 wherein said sensor measures magnetic field strength.

10. The constraint system of claim 7 wherein said unmanned aerial vehicle is a rotary wing and said shutdown limits power to said powertrain to less than power required to maintain hover.

11. The constraint system of claim 7 further comprising a potentiometer, wherein a value of the stored reference electromagnetic field strength is determined during a pre-check stage by adjusting the potentiometer to match a boundary field strength measured at a predetermined largest radial distance from said overhead lines for a planned flight.

12. The constraint system of claim 7 further comprising a memory, wherein the stored reference electromagnetic field strength is stored in the memory.

* * * * *